United States Patent
Soulie et al.

[15] 3,697,104
[45] Oct. 10, 1972

[54] COUPLINGS FOR TOOLS AND SAFETY DEVICES USED IN OIL-WELLS

[72] Inventors: Guy Soulie, Billere; Gerard Lozach, Neuilly-Plaisance, both of France

[73] Assignee: Entreprise de Recherches et d'Activities Petrolieres (ELF), Paris, France

[22] Filed: Feb. 11, 1971

[21] Appl. No.: 114,471

[30] Foreign Application Priority Data

Feb. 16, 1970 France.....................7005350

[52] U.S. Cl................................287/111, 24/211 R
[51] Int. Cl...............................................F16b 1/04
[58] Field of Search........287/111, 114, 2, 127, 20.3, 287/56; 24/211 R

[56] References Cited

UNITED STATES PATENTS

| | | |
|---|---|---|
| 460,792 | 10/1891 | Molseed et al............213/102 |
| 547,248 | 10/1895 | Fetters.......................213/102 |
| 2,349,447 | 5/1944 | Martin..........................279/2 |
| 2,583,880 | 1/1952 | Premo............................287/2 |
| 2,884,270 | 4/1959 | Carlberg.......................279/2 |
| 2,963,310 | 12/1960 | Abolins..................105/366 B |
| 3,000,656 | 9/1961 | Hollaender....................287/2 |
| 3,338,602 | 8/1967 | Arnd............................287/2 |
| 3,389,663 | 6/1968 | Gutridge................105/366 B |
| 3,390,874 | 7/1968 | McCarthy................24/211 R |
| 3,428,346 | 2/1969 | Fredd..........................287/111 |
| 3,568,562 | 3/1971 | Harwood................24/211 R |

Primary Examiner—David J. Williamowsky
Assistant Examiner—Wayne L. Shedd
Attorney—Holcombe, Wetherill & Brisebois

[57] ABSTRACT

A coupling used to connect together two laying or safety devices used in oil-wells, consisting of a hollow cylindrical shell, with two spiral apertures, of the same pitch, cut in opposite sides of it, and containing two split cylindrical components, which cannot move lengthwise in relation to the shell, and which include a narrower section beyond each end of the shell, followed by a wider section with truncated shoulders and plane sides; two wedges fit inside these components, and can push them apart, lengthwise mobility of these wedges being provided by pins which fit into the spiral apertures.

2 Claims, 3 Drawing Figures

COUPLINGS FOR TOOLS AND SAFETY DEVICES USED IN OIL-WELLS

The present invention concerns a coupling which can be fitted between the laying and raising tools or safety devices used for oil production in oil-wells.

These laying and raising tools, and the propelling devices accompanying them, are forced along a pipe by oil pressure, to the positions provided for them inside the pipe, near the oil-producing formation.

The appliances are used mainly in underwater wells, where the pipes in which they have to move are laid on the sea-bed, for connection on the one hand to a production rig or to land, and on the other to the production tubing, which is more or less vertical. This situation produces curves, and the appliances therefore have to have a much smaller diameter than the pipe, be short in length, and be connected by swivel couplings.

The present invention concerns couplings providing a swivel joint between two tools or devices, allowing a line of such tools or devices to be assembled, for lowering into a well by pumping.

The coupling according to the present invention consists of a hollow cylindrical shell, with two spiral apertures of the same pitch cut in opposite sides of it, and containing two split cylindrical components, which cannot move lengthwise in relation to the shell, and which include a narrower section beyond each end of the shell, followed by a wider section with truncated shoulders and plane sides, and with two wedges, fitting inside the said components, and able to push them apart, lengthwise mobility of the said wedges being provided by pins which fit into the spiral apertures.

It will be easier to understand the invention from the following description of one embodiment of it, illustrated by the accompanying figures.

Figure 1:
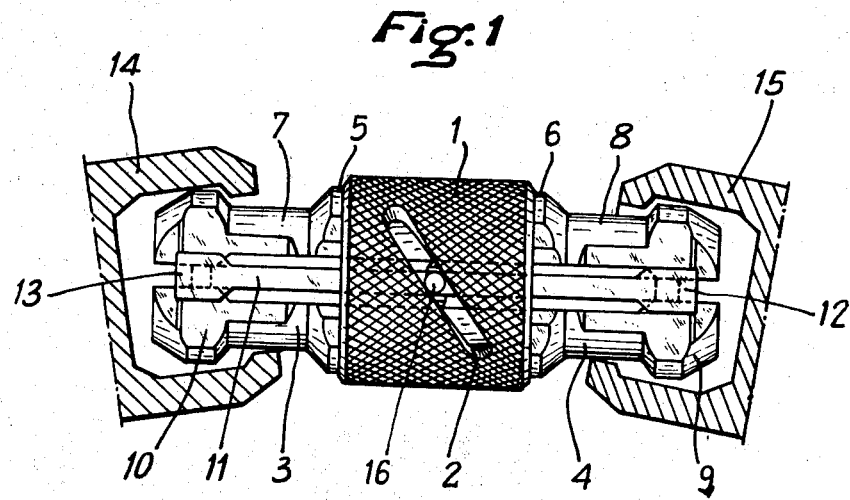
FIG. 1 shows the device in operating order.

In FIG. 1, a hollow cylindrical shell 1 contains two spiral apertures 2, only one of which is visible in the drawings.

Two split components 3 and 4 are placed inside the shell 1. They are prevented from moving lengthwise in relation to the shell by two shoulders 5 and 6. Beyond the ends of the shell are two narrower sections 7 and 8, followed by wider sections 9 and 10, the ends of which are truncated. Two wedges 11, only one of which is visible in the drawing, can slide lengthwise, in the same direction. As they move, the ends 12 and 13 of these wedges push the components apart. When the shell revolves, the pin 16 is pushed in one direction or the other, and the wedges are withdrawn from their advanced position at one end; the split components retract, allowing the wide end section to enter the housing provided in one of the tools 14 or 15. In this way, a number of tools or other devices can be assembled, linked by swivel joints, and forced through a pipe by means of oil pressure, bending to allow for curves in the pipe.

Figure 2:
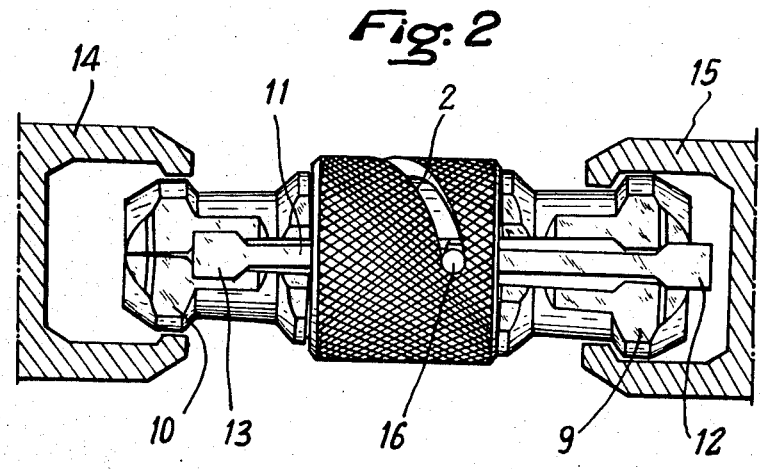
FIG. 2 shows how the coupling is inserted into a tool, for pumping through a pipe.

FIG. 2 illustrates the relative movement of the split cylindrical components and the wedges. When the shell 1 revolves, the pin 16 is made to move by the spiral opening 2, resulting in the displacing of the wedge 11. The end 13 of the wedge is drawn back into the narrower section of the split cylindrical components, while the other end 12 moves outwards beyond the components. The wide ends of the components 10 thus come together, while the wide ends 9 remain blocked inside the housing 15.

By rotating the shell 1 the pin 16 is made to return to a median position (as shown in FIG. 1), and both tools or devices 14 and 15 are held locked.

Figure 3:
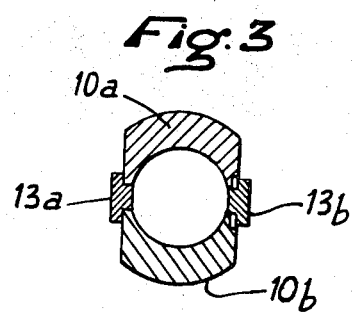
FIG. 3 shows the relative positions of the split components and wedges, in the gripping position.

FIG. 3 shows a cross section of the cylindrical components and wedges at the level of the wide section 10, when the components are in their locking position. The wide ends 10a and 10b are held apart by the wedges 13a and 13b.

What we claim is:

1. A coupling for connecting together two tools having recessed ends, said coupling comprising a hollow substantially cylindrical shell having two radially opposed slots therein, with both slots positioned at substantially equal but opposite angles to the longitudinal axis of the shell, two parallel members having part-cylindrical outer surfaces extending through said shell to project from both ends thereof, said parallel members being provided with abutments which cooperate with abutments on said shell to prevent longitudinal movement of said parallel members in said shell, and having transversely enlarged end portions and transversely narrower intermediate portions therebetween, and at least one wedge member slidably positioned between said parallel members and carrying pin means projecting into said slots, said parallel members having inwardly sloping shoulders near each end portion whereby rotation of said shell relative to said wedge member advances said wedge member between the shoulders near one end of said coupling to further separate the parallel members at said one end, while permitting said parallel members to approach each other more closely at the other end of said coupling.

2. A coupling as claimed in claim 1 comprising a pair of wedge members lying on diametrically opposite sides of the axis of said shell.

* * * * *